No. 802,483. PATENTED OCT. 24, 1905.
B. G. SIMMONS.
DENTAL APPLIANCE.
APPLICATION FILED MAR. 8, 1905.

Witnesses.
Harry L. Ames.
H. H. Masson

Inventor.
Bert G. Simmons
by E. E. Masson
Atty.

UNITED STATES PATENT OFFICE.

BERT. G. SIMMONS, OF NEW BRUNSWICK, NEW JERSEY.

DENTAL APPLIANCE.

No. 802,483.      Specification of Letters Patent.      Patented Oct. 24, 1905.

Application filed March 8, 1905. Serial No. 249,064.

*To all whom it may concern:*

Be it known that I, BERT. G. SIMMONS, a citizen of the United States, residing at New Brunswick, in the county of Middlesex and State of New Jersey, have invented certain new and useful Improvements in Dental Appliances, of which the following is a specification.

This invention has relation to dental appliances, and more particularly to devices for retaining absorbent material in position to absorb saliva and to keep the teeth dry during dental operations.

Objects of the invention are to provide a simple, inexpensive, and efficient appliance which may not be accidentally dislodged, which will admit of the ready application and positive retention of dental rolls, and which will serve to distend the mouth or resist the closing of the same.

To these and other ends hereinafter referred to the invention consists in the improvements presently to be described, and defined in the appended claim.

The nature, characteristic features, and scope of the invention will be more clearly understood from the following description, taken in connection with the accompanying drawings, forming part hereof, and wherein—

Figure 1:
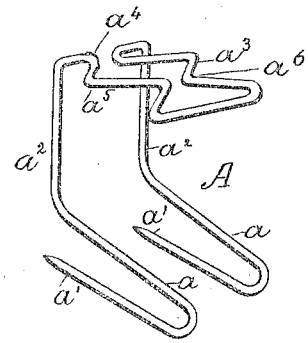
Figure 2:
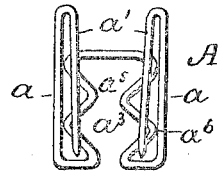
Figure 3:
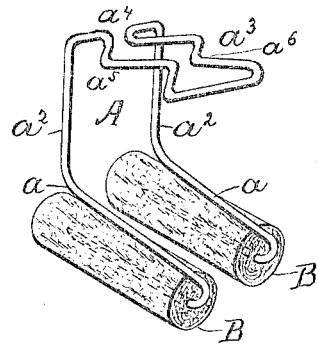

Figure 1 is a perspective view of a dental appliance made in accordance with the present invention. Fig. 2 is an under side view of the appliance, and Fig. 3 is a perspective view of the appliance with the dental rolls applied.

In the drawings, A designates the clamp or appliance, and B the dental rolls, which latter are of cotton or other absorbent material. The appliance may be conveniently and inexpensively made of a single piece of spring-wire bent upon itself to provide a pair of spaced clamping-jaws $a$, which have the backwardly-turned shafts or fingers $a'$, which pierce and carry the rolls B. The near ends of the jaws are bent upwardly and substantially perpendicularly, as at $a^2$, and merge or terminate in a looped or clamping member $a^3$, which overhangs the jaws and acts as a mouth-distender or as a resistance device to prevent closing of the mouth. The sides of said overhanging member are zigzag or staggered, as at $a^4$, $a^5$, and $a^6$, in respect to each other and are so fashioned to engage the upper teeth.

In practice the jaws $a$, with the dental rolls secured to their shafts, are snapped apart to enable the rolls to clasp or straddle the teeth. The overhanging zigzag member $a^3$ engages the cusps of the upper teeth, preventing its slipping, and the upright posts $a^2$ tend to transfer any thrust or pressure upon said member $a^3$ to the jaws, so that their clamping action is accelerated and the rolls are clasped more tightly against the teeth and gums.

Having described the nature and objects of the invention, what I claim as new, and desire to secure by Letters Patent, is—

A dental appliance comprising a pair of substantially parallel clamping-jaws whereof each is adapted to carry a dental roll, said jaw terminating in an overhanging looped member having zigzag or staggered walls for engagement with the cusps of the upper teeth, substantially as specified.

In testimony whereof I affix my signature in presence of two witnesses.

BERT G. SIMMONS.

Witnesses:
    F. W. CONING,
    EDWARD MORRIS.